US006883275B2

(12) United States Patent
Hellinga et al.

(10) Patent No.: US 6,883,275 B2
(45) Date of Patent: Apr. 26, 2005

(54) METHOD AND APPARATUS FOR CONTROLLING THE SPEED OF CLOSING OF A MOVABLE ELEMENT

(75) Inventors: Richard J. Hellinga, Waterloo (CA); Michael Johnson, Toronto (CA)

(73) Assignee: Multimatic, Inc., Markham (CA)

( * ) Notice: Subject to any disclaimer, the term of this patent is extended or adjusted under 35 U.S.C. 154(b) by 0 days.

(21) Appl. No.: 10/206,628

(22) Filed: Jul. 29, 2002

(65) Prior Publication Data

US 2004/0016180 A1 Jan. 29, 2004

(51) Int. Cl.[7] .............................. E05F 11/28; B60J 5/10
(52) U.S. Cl. ......................... 49/345; 49/340; 296/146.8
(58) Field of Search ......................... 296/146.8; 49/345, 49/339, 340, 197, 204, 203, 205, 206

(56) References Cited

U.S. PATENT DOCUMENTS 5,245,137 A * 9/1993 Bowman et al. ............ 177/139
5,982,126 A 11/1999 Hellinga et al.
6,157,154 A * 12/2000 Amagasa .................... 318/443
6,263,595 B1 * 7/2001 Ake ............................ 37/348
6,533,342 B1 * 3/2003 Auer et al. .................... 296/76
6,600,285 B1 * 7/2003 Mintgen et al. ............ 318/468
6,640,494 B1 * 11/2003 Hormann ....................... 49/31
6,719,356 B1 4/2004 Cleland et al.

FOREIGN PATENT DOCUMENTS

JP 60-155048 * 8/1985

* cited by examiner

*Primary Examiner*—Gregory J. Strimbu
(74) *Attorney, Agent, or Firm*—Kramer & Amado, P.C.; Gordon J. Zimmerman, Esq.

(57) ABSTRACT

A method and system for controlling the descent of a moveable element pivotally attached to a rigid structure. The moveable element is pivotally attached to the rigid structure, and is then pivotally connected to a compressible strut, which is pivotally attached to a linkage pivotally connected to the rigid structure. The descent of the moveable element is controlled using a microcontroller and a motor attached to the linkage, and the control path for the linkage is selected based on a comparison of the angle between the linkage and rigid structure and the angle between the moveable element and the rigid structure.

10 Claims, 4 Drawing Sheets

METHOD AND APPARATUS FOR CONTROLLING THE SPEED OF CLOSING OF A MOVABLE ELEMENT

FIELD OF THE INVENTION

The present invention relates generally to controlling the descent of moveable element, such as a gate. More particularly, the present invention relates to controlling the descent of a moveable element by measuring the angles between pivoting angles.

BACKGROUND OF THE INVENTION

It is common in many fields that a door or gate is attached to a rigid structure for pivoting around the point at which it is attached. To automate the opening and closing of the movable element, a strut is commonly used to further connect the rigid and moveable elements.

The strut is typically both extendable and collapsible, so that it can alter its length to allow a movable element, such as a gate, to close at a controlled rate. In many instances, a linkage is employed to connect the strut to the rigid structure. This linkage is pivotable about both the strut and the rigid structure. Such as system is illustrated in FIG. 1.

FIG. 1 illustrates an upright rigid structure A, attached to the ground G, with a constant angle AG. At one end, a moveable element B, such as a gate, is pivotally connected to rigid structure A. Linkage D is pivotally attached to rigid structure A, and is in also connected to moveable element B by strut C. Strut C is pivotally attached to both moveable element B and to linkage D. The pivotal joints between A and B, and between A and D, are represented by angles AB and AD respectively.

In order to close moveable element B, linkage D is rotated with respect to rigid structure A. This reduces the force on strut C and so angle AB is reduced. As the angle AB decreases, due to the continued rotation of linkage D, the force exerted on strut C by element B increases. This force causes strut C to shorten by compression of the piston. If the angle AB is known at the point when Strut C starts to shorten it is possible to control the rate of change of angle AB.

The control of the rate of change of this angle is of interest in a number of fields. To control the descent of moveable element B (which can also be described as controlling the rate of change of angle AB), there are two traditional approaches. Both these approaches implement motorised control of the linkage D to control its positioning with respect to rigid structure A. By varying angle AD the mechanical advantage of strut C is changed so that the combined effect of the compression and change of position result in a controlled descent of moveable element B.

The first approach to controlling moveable element B is to use an open loop control that assumes that the system is unchanging and will always respond to a particular input with the same response curve. Though this is a reasonable assumption while the conditions under which the system is operated are controlled, in an uncontrolled environment these assumptions become invalid. For example, if used outdoors, moveable element B may be loaded with snow or ice, thus changing its effective weight, which will cause strut C to compress at a greater rate than it otherwise would. Additionally, strut C is usually modelled as an ideal spring, which deforms linearly with respect to the applied force, but in reality, the struts are known to have a changing gas pressure as a result of temperature variations, and loss of gas through use of the strut. This has the effect of dynamically changing the spring constant associated with strut C. These variations render the open loop control system inaccurate after moderate exposure to a functional environment.

The second traditional approach is to create a multiple-input-multiple-output (MIMO) control system. To create a MIMO control system a detailed model of the system must be constructed. This model accounts for the weight of moveable element B, the pressure in the piston of strut C and the temperature of the gas in the piston among other factors. This model is then used by a MIMO control system such as a linear quadratic regulator, or a sliding state controller to control the rate of change of angle AB. Though the parameterisation of the system will not necessarily account for the aging of strut C, it is possible to modify the parameterisation model to account for the aging effects, and potential loading of moveable element B on an ongoing basis, using the sensed data to determine the fluctuations in the model parameters. This allows the MIMO control system to accurately control the descent of moveable element B. The drawback to this sophisticated approach is that it requires a high degree of complexity in its implementation. Sensors must be connected to all the elements in the system to measure loading, pressurisation and temperature, along with other variables, so that the parameterisation can be maintained. This is both computationally expensive and impractical to implement when cost conscious decisions are required.

It is, therefore, desirable to provide a method of accurately controlling the descent of a moveable element with respect to a rigid structure without requiring monitoring of the elements to determine a new set of parameterisations to create a complex control system.

SUMMARY OF THE INVENTION

It is an object of the present invention to obviate or mitigate at least one disadvantage of previous method and systems for controlling the descent of a moveable element in a four link system.

In a first aspect of the present invention there is provided a system for controlling the two phase descent of a moveable element that is pivotally attached to a rigid structure. The system includes a linkage, a compressible strut, angle measuring means, and control means. The linkage is pivotally attached to the rigid structure. The compressible strut is pivotally connected to both the linkage and the moveable element. The angle measuring means is connected to measure an angle between the moveable element and the rigid structure at their pivotal connection. The control means is operatively connected to the angle measuring means to receive the measured angle, and used for determining the start of a transition between the first and second phases of the descent of the moveable element, and for selecting a descent profile from a table based on the measured angle at which the transition between the first and second phases occurs, and for controlling the angle between the linkage and the rigid structure during the second phase of the descent based on the selected profile. In an embodiment of the first aspect of the present invention, the angle measuring means further includes means to measure a further angle between the linkage and the rigid structure at their pivotal connection, a change in a relationship between the measured angle and the further measured angle indicating the transition. In an alternate embodiment of the first aspect of the present invention, a sensor is operatively connected to the compressible strut to determine a compression condition of the strut, a change in the compression condition indication the transition.

In an embodiment of the first aspect of the present invention the control means includes a microcontroller for determining the transition between the first and second phases of the descent of the moveable element by monitoring the relationship between the angle between the moveable element and the rigid structure and the angle between the linkage and the rigid structure, for selecting a descent profile from a table based on the angle at which the transition between the first and second phases occurred. In another embodiment of first aspect, the control means includes a motor, operatively connected to the microcontroller for receiving the selected descent profile, and to the linkage for controlling the angle between the linkage and the rigid structure during the second phase of the descent based on the received profile. In other embodiments of the present invention the microcontroller includes either an open loop or a closed loop controller for selecting an open loop or a closed loop descent profile, respectively, from the table. In other embodiments of the present invention angle measuring means include either a magnetic rotary encoder, or an optical encoder, connected to measure the angle. In another embodiment, the compressible strut includes a compressible piston, while the moveable element is either a gate or a door.

In a second aspect of the present invention, there is provided a method for controlling the descent of a moveable element that is pivotally attached to both a rigid structure and to a strut, the strut being pivotally connected to a linkage which in turn is pivotally connected to the rigid structure. The method comprises the following two steps. The first step is selecting a control profile in accordance with an angle between the moveable element and the rigid structure at a transition between a first and second phase of the descent of the moveable element. The second step is controlling the movement of the linkage with respect to the rigid structure in accordance with the selected control profile. In an embodiment of the present aspect of the invention, prior to the step of selecting, are the following three steps. First, measuring a first angle between the moveable element and the rigid structure. Second, measuring a second angle between the linkage and the rigid structure. Third, determining the transition between the first and second phases of the descent when the first and second angles cease tracking each other in accordance with a first relationship indicative of the first phase of the descent of the moveable element. In an alternate embodiment of the second aspect, prior to the step of selecting is the step of determining the transition between the first and second phases of the descent by determining a change in the compression condition of the strut.

In an embodiment of the second aspect, the step of selecting a control profile includes the step of selecting an open loop control. In an alternate embodiment, the step of selecting a control profile includes the step of selecting closed loop control, where the closed loop control is either a proportional control or a proportional-integral-derivative control. In another embodiment, the step of comparing includes determining if the first and second angles are tracking each other in accordance with a linear relationship.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for controlling the descent of a moveable element such as a gate.

Using empirical information about the system it has been determined that there is a relationship between angles AB and AD, and between the rate of change of these angles as well during the descent of moveable element B. As moveable element B begins to descend, strut C does not compress, and instead linkage D pivots about rigid structure A to reduce the mechanical advantage. During this initial phase of the descent of the gate, there is a relationship between angles AB and AD. In many cases the relationship is linear, but different arrangements using different elements can result in a direct but non-linear relationship.

During the second phase of the descent of moveable element B, the strut C begins to compress as the weight of moveable element B exceeds the supporting capacity of the piston in strut C. At this point, the initial relationship between AB and AD ceases, and a new relationship begins. The new relationship may be both direct and linear, but it is noticeably different than the initial relationship.

The angle AB at which the first relationship ceases is determined by the variable factors of the system including the weight of moveable element B and the supporting force of strut C. The point at which the relationship changes is used in the present invention to select a control system to lower moveable element B. In using the measured angle AB, the present invention does not require equipment used to monitor the loading of moveable element B, or the pressure supporting force of strut C. Instead the present invention provides a variety of modes that offer an implementation that is only moderately more complex than an open loop control, while offering many of the advantages of the MIMO control systems.

If the relationship between AB and AD is monitored, the transition between the first and second phases can be detected by determining the angle at which the relationship between AB and AD changes. The specific angle AB at which this happens is a function of a number of variables, including the weight of moveable element B on strut C and the resilience of strut C to deformation, this function provided by the compressed gas and the force of which is a function of the cross-sectional area of the piston and the volume and pressure of the as which is in turn a function of both the quantity of gas in the piston and the temperature of the gas. The weight of moveable element B on strut C is also a function of the orientation of rigid structure A with respect to ground G. If rigid structure A is part of a truck, and the truck is inclined, the force of moveable element B on strut C varies with respect to the inclination of the truck.

Figure 2:
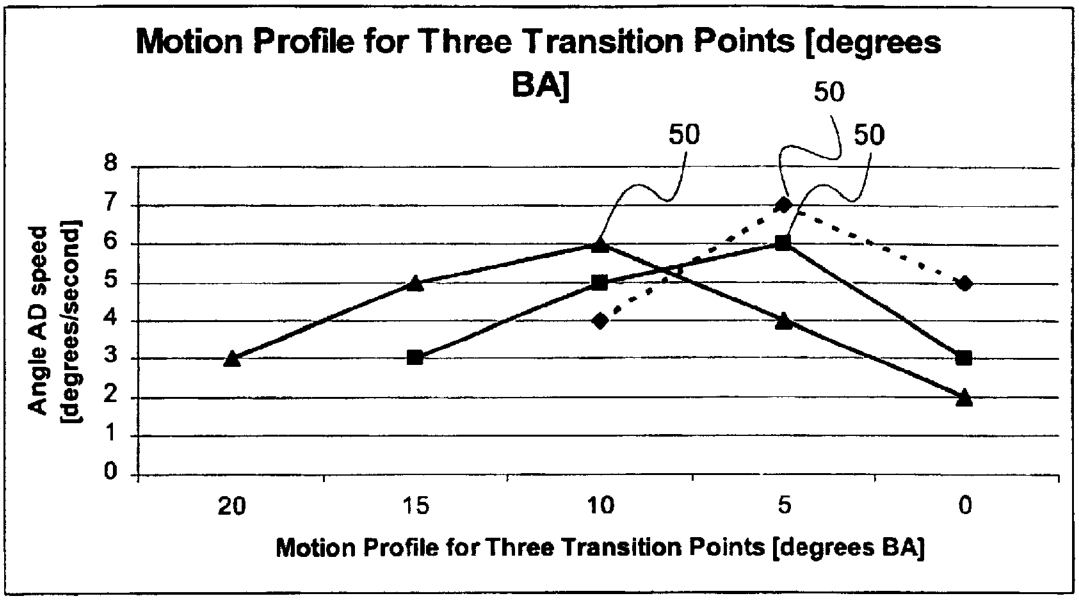
FIG. 2 is an illustration of the correlation between angles AD and AB in a number of system.

FIG. 2 is a graph illustrating the change in the angular relationship between AB and AD. The three different relationships represent different profiles of loading on moveable element B, and resilience of compressible strut C. Each of the three relationships is associated with a different profile used to select the control that guides moveable element B to close. In each graph, the transition point 50 between the first and second relationships of angles AB and AD are shown. When this transition point 50 is detected the measurement of angle AB recorded.

If one considers that the aforementioned variety of factors controls the rate of descent of moveable element B with respect to rigid structure A, it becomes apparent that these factors also control the angle at which the relationship between angles AB and AD ceases to function. This transition angle is simple to determine, as it requires only comparison of angular measurements from two linkages. One of skill in the art will readily appreciate that there exist a number of known mechanisms that can monitor this angle such as a rotary position encoder or magnetic rotary positon sensor, or a simple potentiometer After the relationship of phase one ceases, the second phase of the descent commences, and strut C begins compressing. The rate of compression, as determined by the weight of moveable element B, the cross-sectional area of the piston and the volume and pressure of the gas will directly affect the rate of descent, and together are factors in determining the angle at which the transition from the first phase to the second phase begins. Whereas a MIMO system characterises the system using a plurality of variables that are difficult to determine, the present invention characterises the system using the angle AB at which the first relationship between AB and AD ceases.

In the prior art, open loop control systems have been implemented using one model of the system, so that after a fixed amount of time a microcontroller activates a motor to control the movement of linkage D so that linkage D follows a predetermined path and controls the descent of moveable element B. This is insufficient as the system parameters vary over time. In the present invention, a microcontroller stores a number of profiles for the system. These profiles are characterised by the angle AB at which first relationship between AB and AD ceases. Each of these profiles defines a different control algorithm to be used to move linkage D, so that the descent of moveable element B can be controlled.

A plurality of profiles can be stored by the microcontroller that will be used to select the path through which linkage D is controlled. This allows the system to be characterised by a simple angular measurement instead of relying upon the complex characterisation of a MIMO control system. The simplicity of the characterisation of the system results in a reduction in the number of elements that must be monitored. This reduction has a corresponding reduction in the cost of implementing the control system.

In one embodiment of the present invention, the profiles that are selected by the microcontroller are open loop controls that are used as input to a motor controlling the movement of linkage D. If the angle at which AB and AD cease to track according to the first relationship does not correspond to one of the predefined profiles, the microcontroller will select the open loop control profile closest to the actual angle.

In an alternate embodiment, the profiles selected by the microcontroller are closed loop controls that use the angular measurements of AB as an input, in addition to the known angular measurement of AD, to control the movement of the linkage. These profiles have a greater computational complexity than the stored open loop controls, but provide many of the benefits of closed loop control, including the ability to compensate for minor variations in the parameterisation variables. This results in a better control of the descent of moveable element B, when the determined angle does not exactly match the angles associated with the profiles.

In an alternate embodiment, the determination of the transition is achieved through a direct sensor that is attached to strut C to determine its compression condition. When the strut transitions from a phase in which it does not compress to a state that it does compress, the first phase of the descent of the moveable element transitions to the second phase. Once a transition in this sensor is detected, angle AB is noted and is used to select the control profile.

Figure 3:
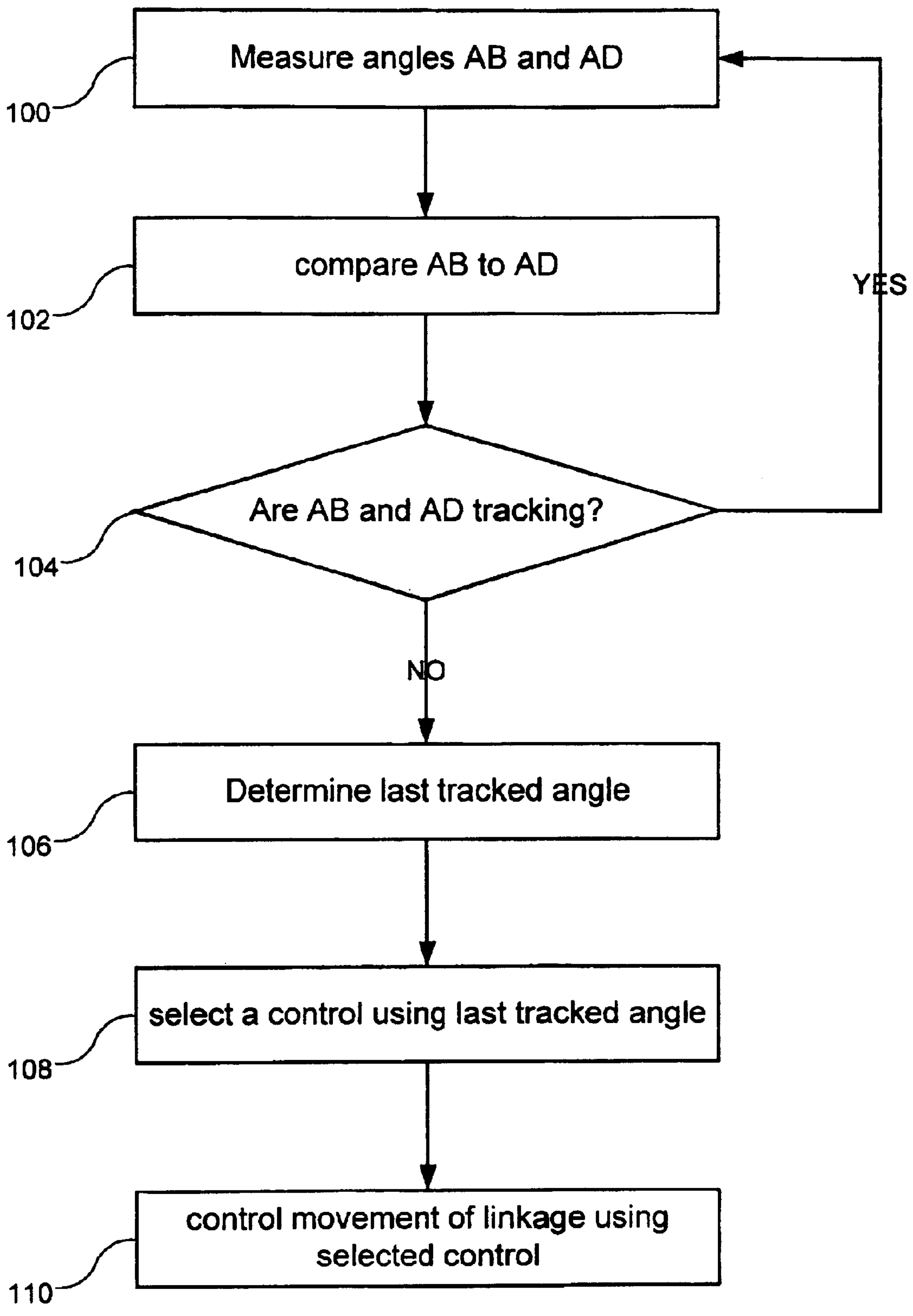
FIG. 3 is a flowchart illustrating a method of the present invention.
Figure 4:
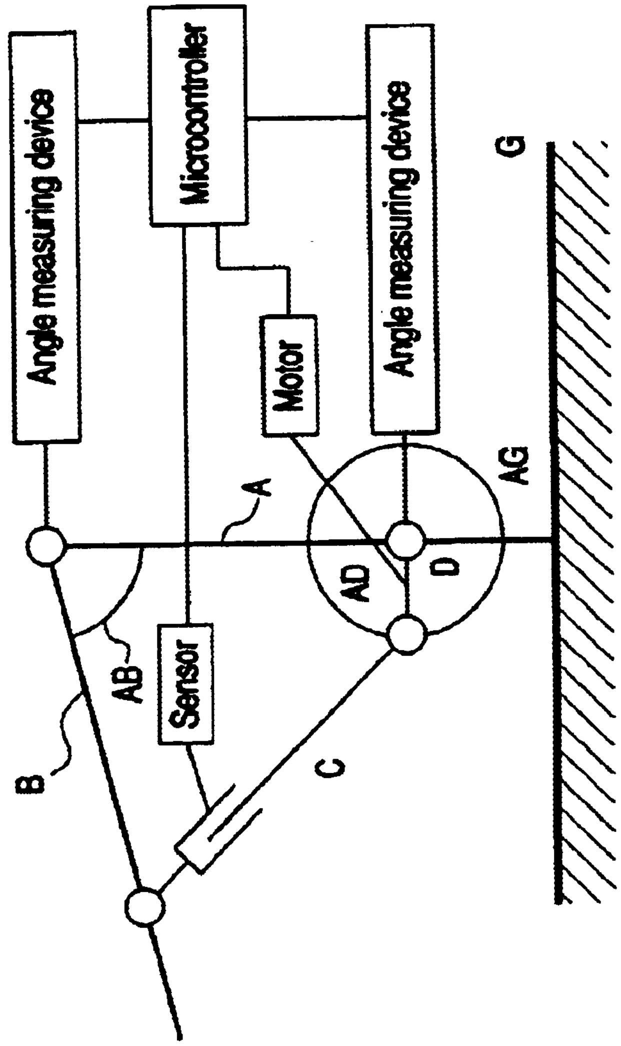
FIG. 4 is an illustration of the implementation of the present invention.
Figure 1:
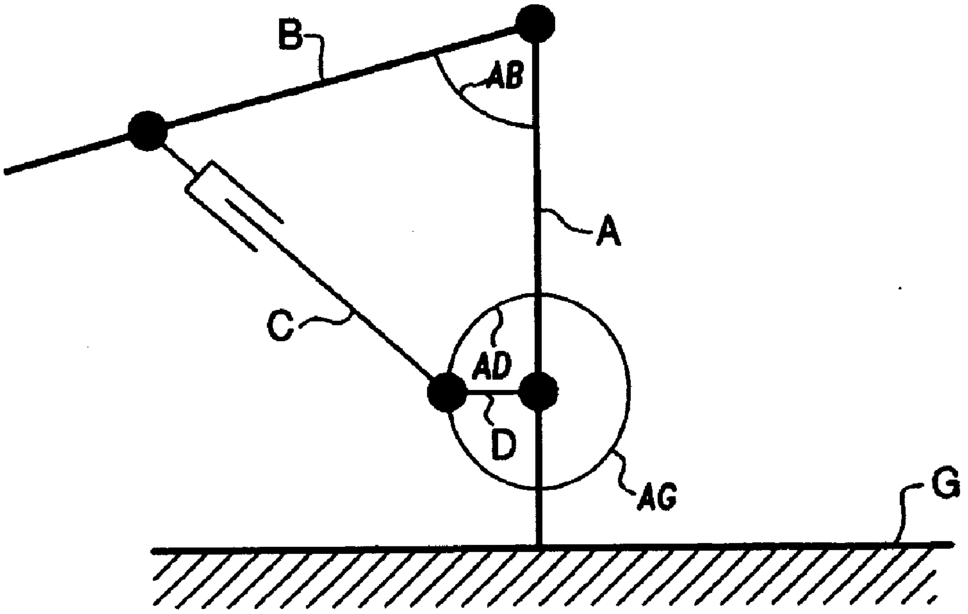

FIG. 3 illustrates the method of the present invention as a flowchart. In step 100 the angles AB and AD are measured. In step 102, angles AB and AD are compared. In step 104, a determination of whether or not AB and AD are tracking is made. If they are tracking each other, the process returns to measuring the angles in step 100. If they are not tracking each other, the angle at which they ceased to track is determined in step 106. The determined angle is used in step 108 to select a control profile. In step 110, the selected control profile is used to control the movement of linkage D so that gate is lowered at the desired rate.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system comprising:

a linkage, pivotally attached to a rigid structure;

a compressible strut, pivotally connected to both the linkage and one of a gate and a door pivotally attached to the rigid structure;

means for measuring an angle between the one of the gate and the door;

and the rigid structure at their pivotal connection;

control means, operatively connected to the angle measuring means, for receiving the measured angle, for determining a start of a transition between first and second phases of the descent of a one of the gate and the door, and for selecting a descent profile from a table based on the measured angle at which the transition between the first and second phases occurs, and for controlling the angle between the linkage and the rigid structure during the second phase of the descent based on the selected profile.

2. The system of claim 1, wherein the angle measuring means further includes means to measure a further angle between the linkage and the rigid structure at their pivotal connection, a change between the measured angle and the further measured angle indicating the transition.

3. The system of claim 1, further including a sensor, operatively connected to the compressible strut to determine a compression condition of the strut, a change in the compression condition indication the transition.

4. The system of claim 1, wherein the control means includes a microcontroller for determining the transition between the first and second phases of the descent of the one of the gate and the door by monitoring the relationship between a angle between the one of the gate and the door and the rigid structure and an angle between the linkage and the rigid structure, and for selecting the descent profile from the table based on the angles at the start of the transition between the first and second phases.

5. The system of claim 4, wherein the control means includes a motor, operatively connected to the microcontroller for receiving the selected descent profile, and to the linkage for controlling the angle between the linkage and the rigid structure during the second phase of the descent based on the received profile.

6. The system of claim 4, wherein the microcontroller includes an open loop controller for selecting an open loop descent profile from the table.

7. The system of claim 4, wherein the microcontroller includes a closed loop controller for selecting closed loop descent profile from the table.

8. The system of claim 1, wherein the angle measuring means includes a magnetic rotary encoder operatively connected to the one of the gate and the door and the rigid structure for determining the angle between them.

9. The system of claim 1, wherein the angle measuring means includes a rotary optical encoder operatively connected to the one of the gate and the door and the rigid structure for determining the angle between them.

10. The system of claim 1, wherein the compressible strut includes a piston.

* * * * *

UNITED STATES PATENT AND TRADEMARK OFFICE

CERTIFICATE OF CORRECTION

PATENT NO. : 6,883,275 B2
DATED : April 26, 2005
INVENTOR(S) : Richard J. Hellinga et al.

Figure 1:
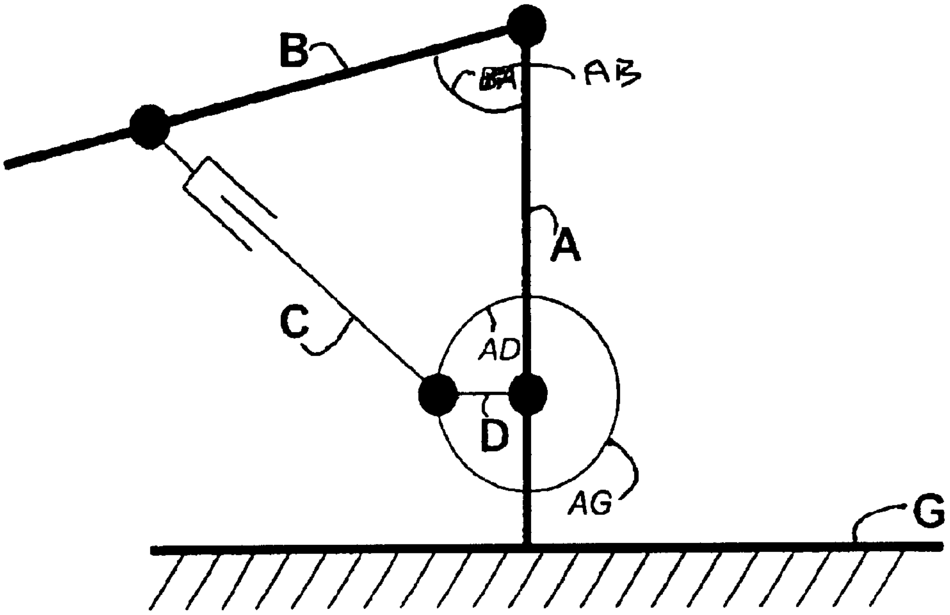
FIG. 1 is an illustration of the system in which the present invention is implemented.

It is certified that error appears in the above-identified patent and that said Letters Patent is hereby corrected as shown below:

Drawings,
Replace FIG. 1 with the attached amended FIG. 1.

Column 1,
Line 9, delete “of moveable” and insert -- of a moveable --.
Line 25, delete “Such as system” and insert -- Such a system --.
Line 30, delete “in”.

Signed and Sealed this

Fourth Day of October, 2005

JON W. DUDAS
*Director of the United States Patent and Trademark Office*